US007156724B2

(12) United States Patent
Kordonski et al.

(10) Patent No.: US 7,156,724 B2
(45) Date of Patent: Jan. 2, 2007

(54) METHOD AND APPARATUS FOR FORMING A DYNAMIC MAGNETIC SEAL USING MAGNETORHEOLOGICAL FLUID

(75) Inventors: William Kordonski, Webster, NY (US); Andy Price, Webster, NY (US); Jerry Carapella, Pittsford, NY (US); Arpad Sekeres, Rochester, NY (US)

(73) Assignee: QED Technologies International, Inc., Aurora, IL (US)

( * ) Notice: Subject to any disclaimer, the term of this patent is extended or adjusted under 35 U.S.C. 154(b) by 107 days.

(21) Appl. No.: 11/012,645

(22) Filed: Dec. 15, 2004

(65) Prior Publication Data

US 2006/0125191 A1    Jun. 15, 2006

(51) Int. Cl.
*B24B 1/00* (2006.01)
(52) U.S. Cl. .................................................. 451/113
(58) Field of Classification Search ............... 277/400, 277/411; 451/36, 37, 103, 104, 113, 114, 451/317
See application file for complete search history.

(56) References Cited

U.S. PATENT DOCUMENTS

| | | | | |
|---|---|---|---|---|
| 2,933,170 A | * | 4/1960 | Grant | 192/21.5 |
| 3,788,275 A | * | 1/1974 | Hanson | 399/104 |
| 4,077,508 A | * | 3/1978 | Pedersen | 198/666 |
| 4,101,211 A | * | 7/1978 | Kayson | 399/104 |
| 4,692,826 A | * | 9/1987 | Raj et al. | 360/97.02 |
| 5,795,212 A | * | 8/1998 | Jacobs et al. | 451/36 |
| 5,951,369 A | * | 9/1999 | Kordonski et al. | 451/5 |
| 6,267,651 B1 | * | 7/2001 | Kordonski et al. | 451/113 |
| 6,309,285 B1 | * | 10/2001 | Kordonski et al. | 451/113 |
| 2004/0262846 A1 | * | 12/2004 | Anzai et al. | 277/410 |

FOREIGN PATENT DOCUMENTS

| | | | |
|---|---|---|---|
| JP | 363125867 A1 | * | 5/1988 |
| JP | 405086977 A1 | * | 4/1993 |
| WO | WO02095271 A1 | * | 11/2002 |

* cited by examiner

*Primary Examiner*—Patricia Engle
*Assistant Examiner*—Gilbert Lee
(74) *Attorney, Agent, or Firm*—Neal L. Slifkin; Robert C. Brown

(57) ABSTRACT

An arcuate, preferably cylindrical, magnetic shunt bar supports a plurality of pin magnets having alternate north and south orientations, defining a ring-shaped array of magnets of alternating orientation. The magnet free ends opposite the shunt bar are positioned to conform closely to the shape of a surface to be sealed, forming a narrow gap therebetween containing a multi-polar magnetic field extending beyond the free ends in a direction substantially orthogonal to the surface. The axes of the magnets may be disposed at any desired angular orientation to the surface. Magnetorheological fluid (MRF) in the gap is magnetically stiffened and held as a dynamic seal. The arrangement is useful as a shaft seal, wherein the seal surface passes axially through the array, and also as a wiper for MRF from a carrier surface wherein the surface passes by the array.

24 Claims, 8 Drawing Sheets

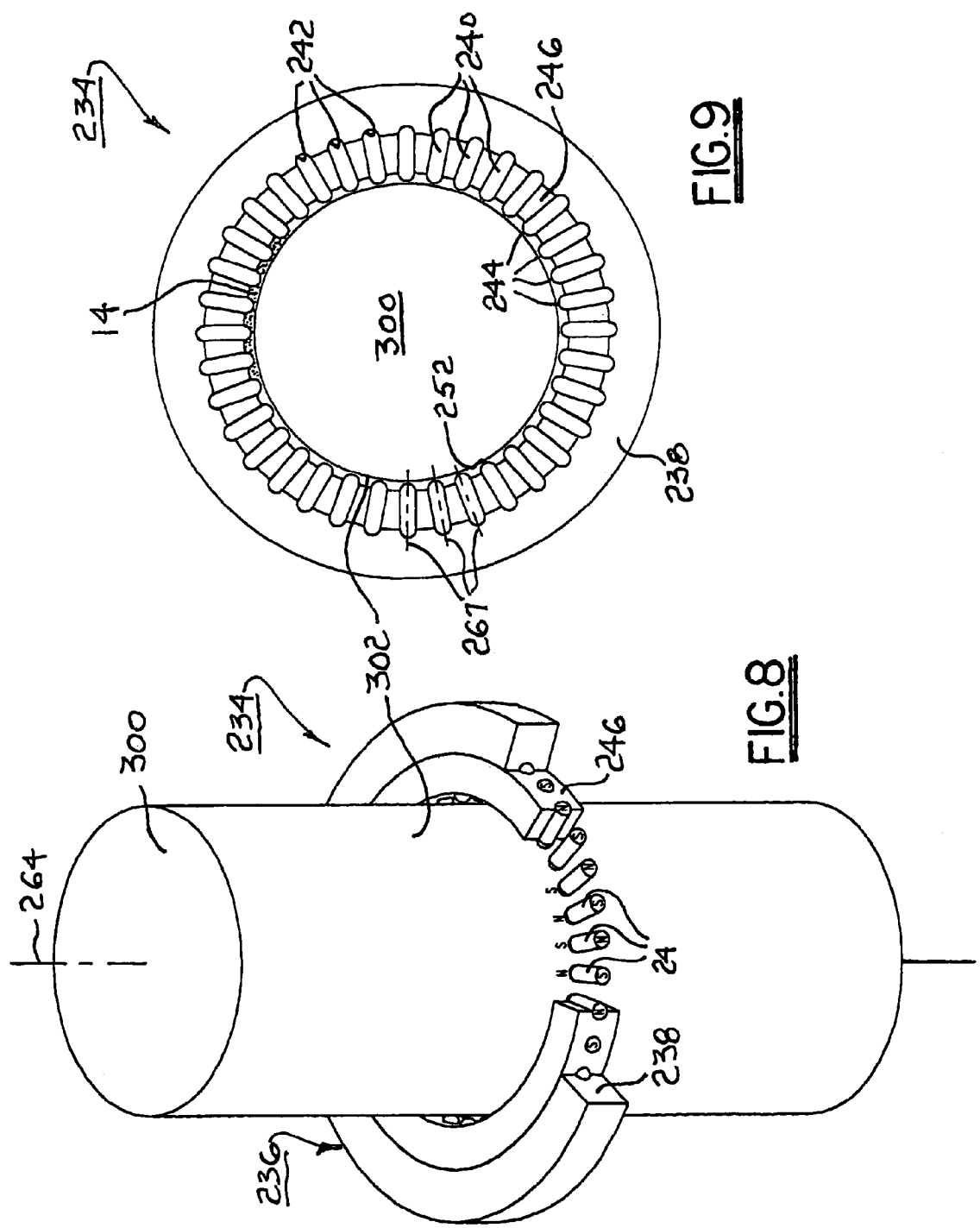

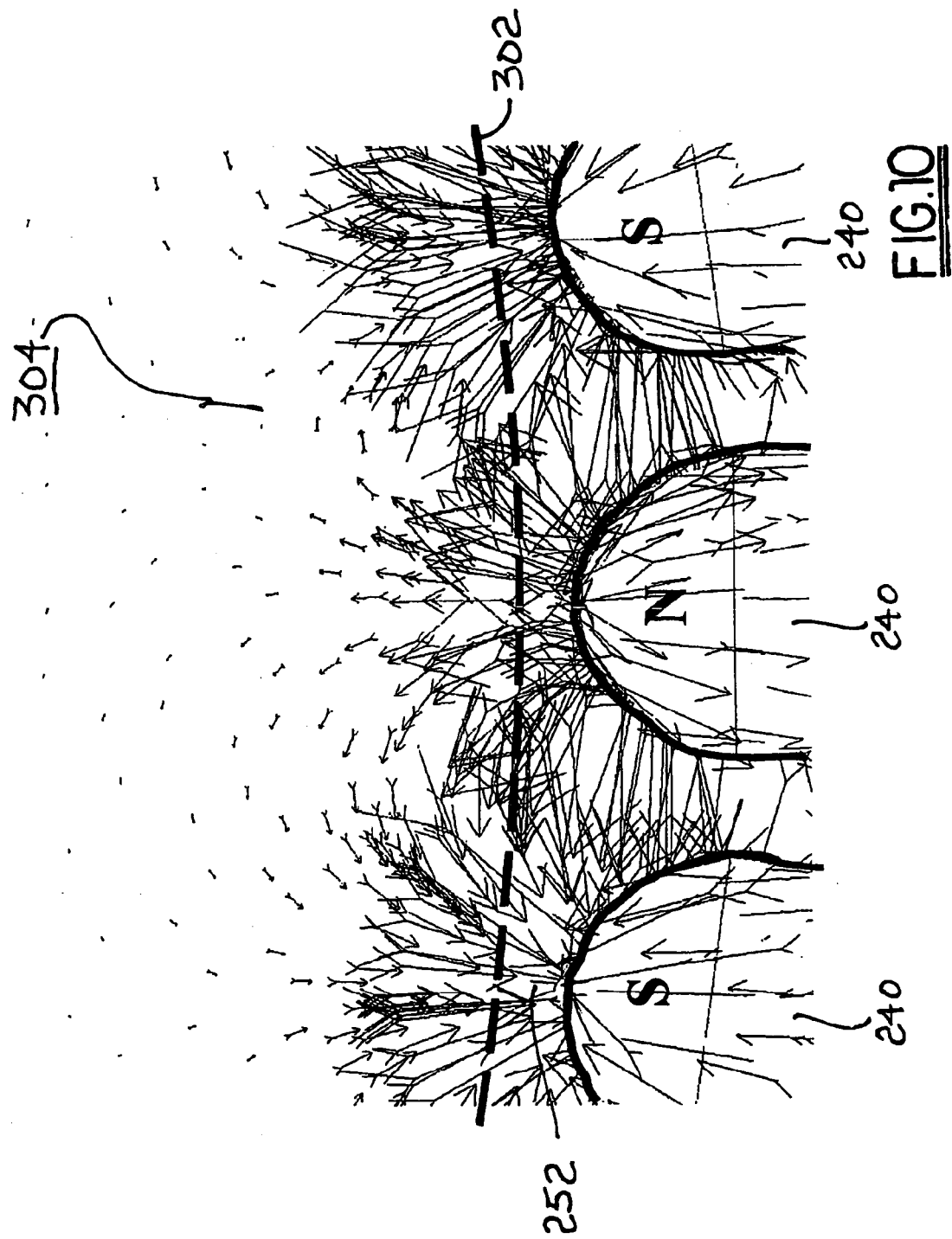

METHOD AND APPARATUS FOR FORMING A DYNAMIC MAGNETIC SEAL USING MAGNETORHEOLOGICAL FLUID

FIELD OF THE INVENTION

The present invention relates to apparatus for forming a dynamic magnetic seal; more particularly, to apparatus for capturing and holding a magnetic or magnetorheological liquid being carried on a moving surface; and most particularly to apparatus for forming a magnetic seal between a magnet array and a sliding or rotating shaft, and also for removing and capturing a ribbon of magnetorheological fluid from a fluid-conveying surface in a magnetorheological finishing apparatus.

It is known to use a ring-shaped magnet surrounding a metal shaft to capture an amount of magnetic fluid between the magnet and the shaft to form a seal against movement of a gas along the shaft surface past the magnet. The shaft may be either sliding axially past the magnet or rotating about its axis.

The following are some exemplary patent disclosures in this field.

In U.S. Pat. No. 5,118,118, issued Jun. 2, 1992 to Tadic et al., an annular permanent magnet has axial poles and two armatures, each armature being in connection with one of the poles thereof, the free end of each armature being located at a short distance from the shaft to form two annular sealing gaps around a shaft having an axis of rotation and being capable of being driven in rotation about its axis. The two gaps are located at a distance from each other and are filled with a quantity of magnetic liquid held therewithin by the magnetic field generated by the permanent magnet by way of the armatures.

In U.S. Pat. No. 5,704,613 issued Jan. 6, 1998 to Holtkamp, a method is disclosed for unsealing and resealing a gap between a magnet and a member having a surface facing the magnet is a closely spaced, noncontacting relationship. A solid-based magnetic medium is disposed therebetween. The member is moveable between a first position and a second position relative to the magnet and has a first magnetically permeable region and a second magnetically non-permeable region. In the first position, the magnetic medium forms a seal in contact with the member, and in the second region the magnetic medium is removed from contact with the member.

In U.S. Pat. No. 6,769,694 B2 issued Aug. 3, 2004 to Anzai et al., a magnetic fluid seal device is disclosed for sealing the clearance of two members assembled to reciprocate relative to each other. A magnetic fluid is held magnetically on one of the two members and contacts the other member for sealing the clearance. A groove formed in the surface of the other member spaces the surface of the other member from the magnetic fluid when the two members are at a specified stop position; however, a seal member seals the clearance when the two members are at the specified stop position. In the stopped state of the two members, the magnetic fluid is positioned in the groove and spaced from the surface of the other member. At the position confronting the magnetic fluid at the stopped time of the two members, therefore, the surface treatment of the other member can be prevented from being deteriorated, but the deterioration of the surface treatment of the surface of the other member does not proceed earlier in a local region so that the lifetime of the device can be elongated.

It is further known to use abrasive fluids having magnetorheological properties to shape, finish, and polish objects, especially optical elements such as lenses and mirrors. See, for example, U.S. Pat. No. 5,616,066, "Magnetorheological Finishing of Edges of Optical Elements," issued Apr. 1, 1997 to Jacobs et al., U.S. Pat. No. 5,795,212, "Deterministic Magnetorheological Finishing," issued Aug. 18, 1998 to Jacobs et al., and U.S. Pat. No. 5,951,369, "System for Magnetorheological Finishing of Substrates," issued Sep. 14, 1999 to Kordonsky et al. The relevant disclosures of these three patents are hereby incorporated by reference. As used herein, all ablative processes wherein abrasive particles are impinged onto a surface to be ablatively shaped are referred to collectively as "finishing."

A magnetorheological finishing machine, as disclosed in the incorporated references, includes a carrier surface on a rotatable element referred to as a carrier wheel. The carrier surface may reside on an axial face of the carrier wheel, or more commonly, on the peripheral radial surface of the wheel which typically is a spherical section disposed symmetrically about an equatorial plane. The carrier surface presents magnetorheological fluid to a work zone having a high magnetic field and carries spent fluid away therefrom. A prior art magnetorheological finishing machine may further include a fluid handling system for regenerating spent fluid and for metering regenerated fluid to the work zone; a nozzle for dispensing fluid from the fluid handling system onto the carrier surface; and a mechanical scraper in contact with the carrier surface for removing spent fluid from the carrier surface and returning it to the fluid handling system to be regenerated.

As disclosed in U.S. Pat. Nos. 6,267,651 and 6,309,285, the relevant disclosures of which are incorporated herein by reference, a magnetic wiper for removing magnetorheological fluid from a carrier surface includes a single distorted horseshoe magnet having north and south polepieces elongated in a first direction orthogonal to a second direction of magnetic flux in the magnet. The polepieces are generally parallel at their free ends in the first direction, having a first gap therebetween containing a magnetic field; are preferably divergent inwardly of the wiper in the second direction to maximize the field strength at the free ends; and are preferably arcuate such that one of the polepieces forms a trough for receiving magnetorheological fluid removed from the carrier surface and conveying it to an exit tube. The free ends are shaped to conform closely to the shape of the carrier surface, forming a second gap between the free ends and the carrier surface, the second gap containing a magnetic fringing field extending beyond the free ends. The first amount of magnetorheological fluid conveyed into proximity with the free ends by the carrier surface is magnetically stiffened to a stiff paste which is retained in the first and second gaps by the magnetic fields and is thereby prevented from continuing onward with the carrier surface. The stiffened fluid forms a dynamic liquid seal in the gaps such that additional magnetorheological fluid carried towards the magnetic gaps by the carrier surface is wiped and diverted away from the surface and into the trough formed by the inner polepiece. Thus, the magnet forms an effective remover of magnetorheological fluid from the carrier surface without any mechanical scraping contact with the surface. Further, there is no wear of the wiper with use, so that performance of the wiper is unaffected by duration of use.

The disclosed prior art magnetic wiper has at least two specific shortcomings.

First, the curvature of the polepieces must be made specifically to match very closely the curvature of the intended surface to be wiped. Thus, different spherical carrier surfaces having differing radii cannot use a commonly-designed wiper; each different sphere requires a wiper having a different curvature of the polepieces.

Second, the magnetic force of the prior art magnet fringing field is inherently relatively weak, which can lead to leakage of MRF past the wiper.

A further and overriding shortcoming exists in all of the prior art magnetic shaft seals and magnetic surface wipers, namely, that the magnetic field produced is parallel to a tangent to the shaft or wheel surface, which is the direction of easiest shear of the structure formed in the stiffened MRF. In addition, the gap between the magnet and the moving surface, in which the magnetic field exists, extends axially along the shaft surface or circumferentially along the wheel surface for a significant distance. The dynamic liquid seal formed in that gap occupies a relatively large surface area against the shaft or wheel, causing significant drag which results in more rapid wear of the surface and greater torque requirement for an actuating motor.

Further, the magnetic field is invariant in a circumferential direction, having zero gradient, and therefore has no field lines in this direction intersecting and extending through the surface.

What is needed in the art is an improved magnetic seal means having greater magnetic force and lower viscous drag.

It is a principal object of the invention to provide an improved magnetic seal means that is useful as a shaft seal and as a magnetic wiper for removing magnetorheological fluid from a carrier surface.

BRIEF DESCRIPTION OF THE INVENTION

Briefly described, a seal means in accordance with the invention includes an arcuate magnetic shunt bar supporting and shunting a plurality of permanent bar magnets, also referred to herein as pin magnets, in an arcuate array. The magnets thereby enjoy a common magnetic shunt. Adjacent of the magnets have alternate north-south orientations. The free ends of the magnets extend from the shunt bar. A surface of a member to be sealed is off-spaced from the array of free magnet ends to define a gap therebetween wherein a magnetic fluid or a magnetorheological fluid is retained as a dynamic seal. The axes of individual magnets may lie at any desired angle of orientation to the surface to be sealed, for example, radially thereof or parallel thereto. The magnets collectively provide a magnetic field strength of preferably about 3000 gauss in the gap.

An advantage of having alternating north and south poles in the free-end array is that the magnetic lines of forces extend away from the tips at an angle to the surface to be sealed and close through that surface, including in the circumferential direction. The surface material may be magnetically permeable or impermeable; thus the invention is useful with surfaces formed from ferromagnetic metals such as iron; non-ferromagnetic metals such as stainless steels; and organic polymers, a distinct improvement on prior art magnetic seals. Thus, magnetorheological fluid in the gap is stiffened against shear in a much more shear-resistant direction than in prior art magnet arrangements wherein the magnetic field lines are substantially parallel to the sealing surface. Hence, a strong seal having a short axial extent is readily provided.

DESCRIPTION OF THE DRAWINGS

The foregoing and other objects, features, and advantages of the invention, as well as presently preferred embodiments thereof, will become more apparent from a reading of the following description in connection with the accompanying drawings in which:

FIG. 8 is an isometric view, partially in cutaway, of a magnetic shaft seal in accordance with the invention;

FIG. 9 is a a cross-sectional view of the shaft seal shown in FIG. 8; and

FIG. 10 is a schematic view of magnetic field lines in a magnetic sealing apparatus in accordance with the invention.

DETAILED DESCRIPTION OF THE INVENTION

Figure 1:
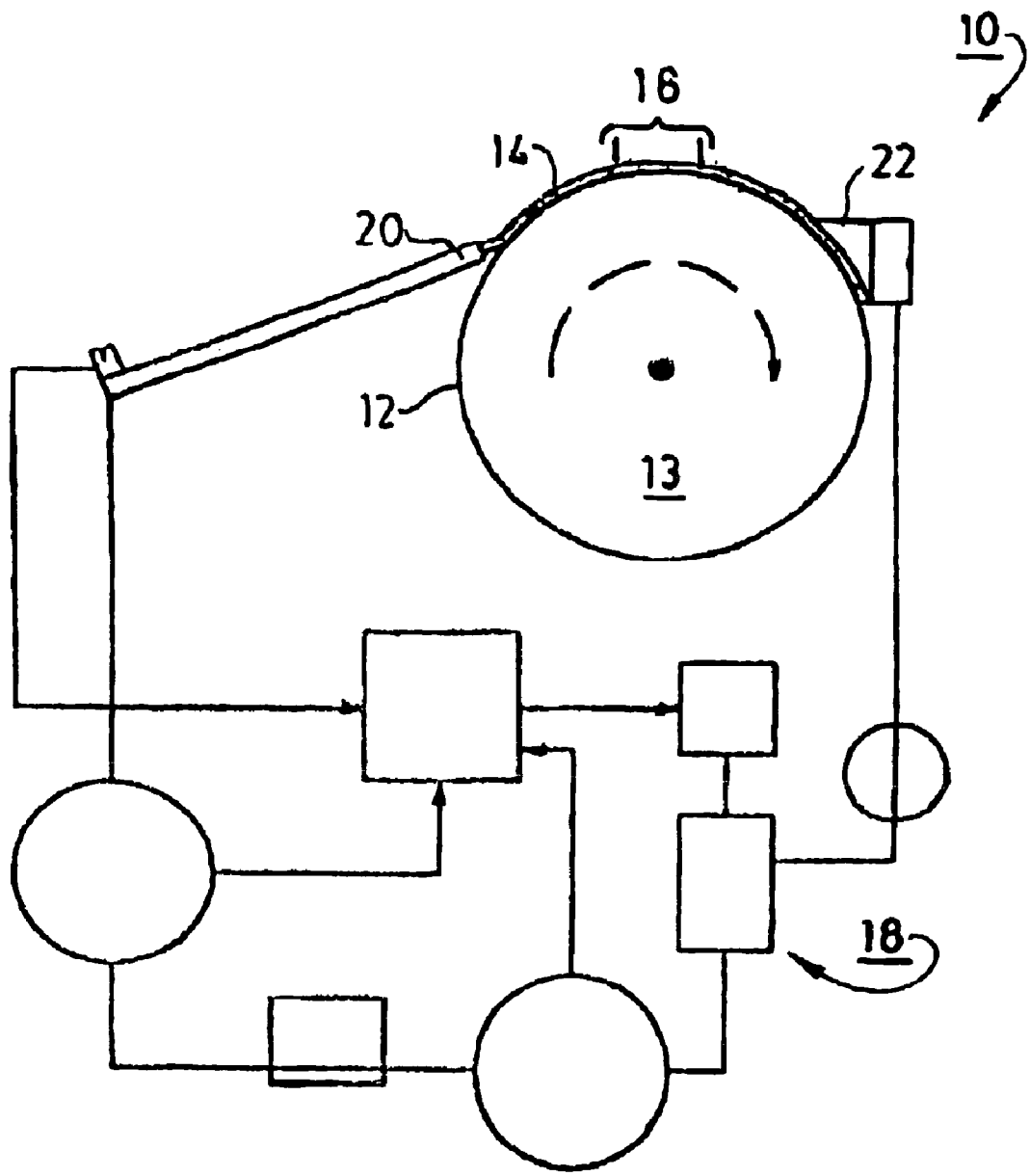
FIG. 1 is a schematic drawing of a magnetorheological finishing machine, showing the position of a prior art magnetic fluid wiper in the fluid flow path.

Referring to FIG. 1, there is shown a generalized schematic drawing of a prior art magnetorheological finishing apparatus 10 substantially as disclosed in U.S. Pat. No. 6,309,285. Apparatus 10 includes a carrier surface 12 on a rotatable carrier wheel 13, typically a cylindrical or spherical section disposed symmetrically about an equatorial plane, for presenting magnetorheological fluid 14 to a work zone 16 on the carrier surface and for carrying the fluid away; further, a fluid handling system 18 for regenerating spent fluid and for metering regenerated fluid to the work zone; further, a nozzle 20 for dispensing fluid from the fluid handling system onto the carrier surface; and further, a prior art magnetic wiper 22 for removing spent magnetorheological fluid from the carrier surface and returning it to the fluid handling system to be regenerated. Other elements of fluid handling system 18 shown in FIG. 1 are fully disclosed in the incorporated references and need not be elaborated further here. Typically, the wiper is disposed at an internal wheel angle of between about 30° and about 180° from the center of the work zone (which is commonly at top dead center position of the wheel, as shown in FIG. 1). To facilitate wiping of the fluid from the carrier surface, it is desirable that the wiper be disposed substantially out of the fringing field created by the work zone magnets.

Figure 2:
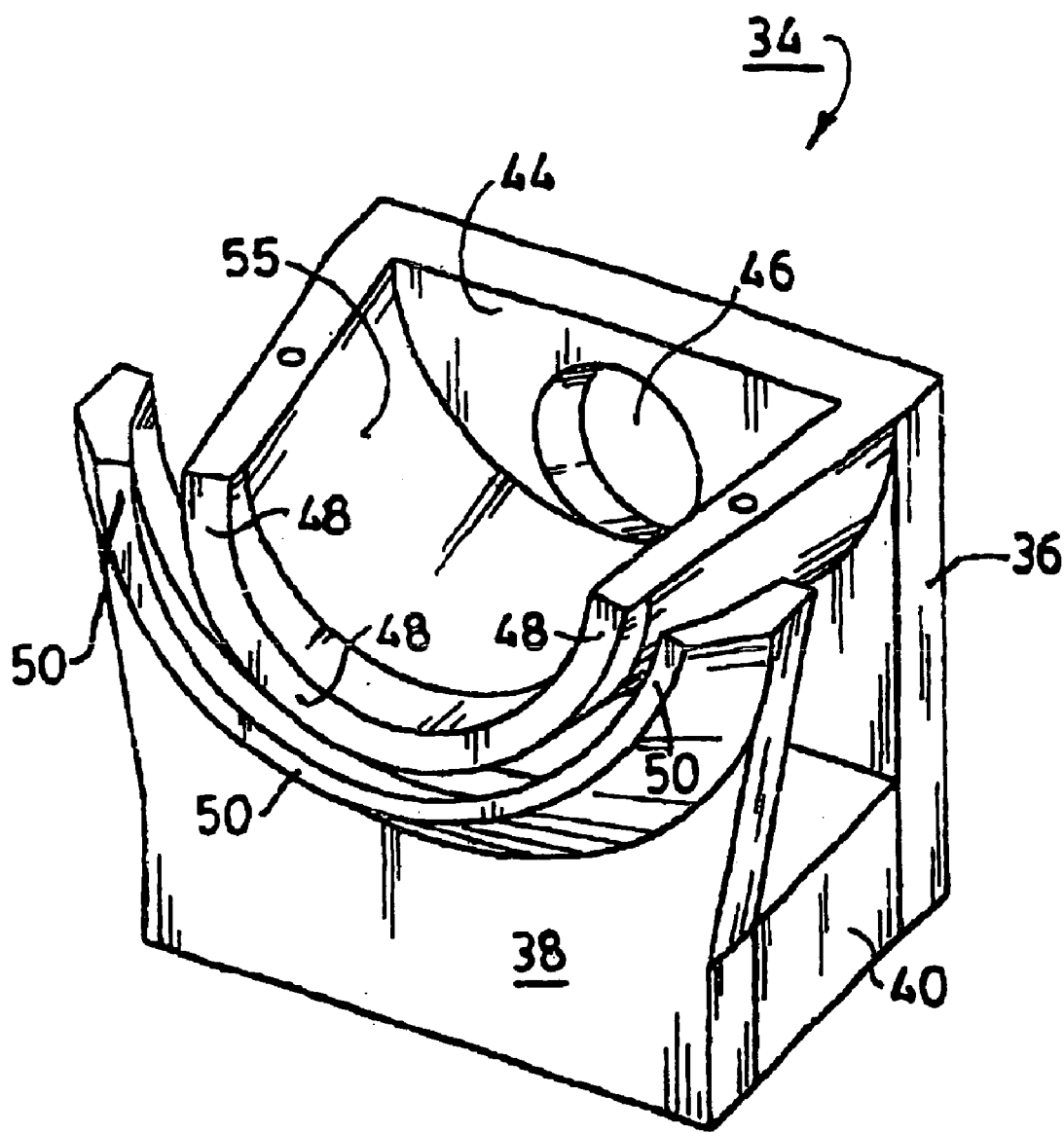
FIG. 2 is an isometric view of a prior art magnetic wiper.
Figure 3:
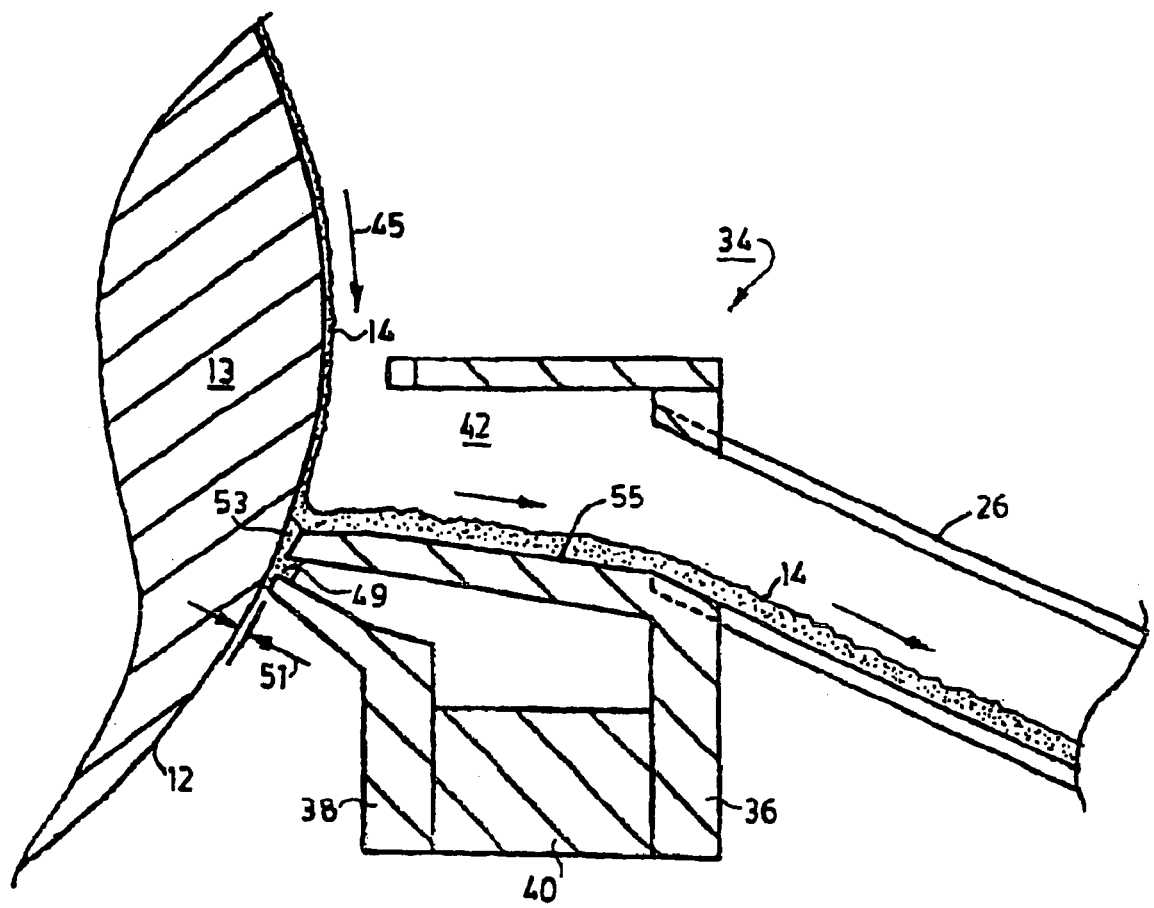
FIG. 3 is an elevational cross-sectional view of the prior art wiper shown in FIG. 2, showing the wiper in operation on a magneto-rheological finishing machine like that shown in FIG. 1.

Referring to FIGS. 2 and 3, a prior art magnetic wiper assembly 34 includes first and second magnetic polepieces, arbitrarily designated as north 36 and south 38, connected to a magnet 40 to form a distorted horseshoe magnet. The polepieces are elongated in a first direction orthogonal to a second direction of magnetic flux and are disposed substantially orthogonal to the direction of motion of magnetorheological fluid entering the wiper assembly. Preferably, the polepieces are curved in the first direction such that polepiece 36 forms and defines the bottom 55 of a trough-shaped chamber 42. Polepiece 36 further comprises a flange 44 forming a rear wall of chamber 42 having a port 46 therethrough for receiving fluid return tube 26. Polepieces 36 and 38 are configured at the free ends thereof, 48,50 respectively, to have a first gap 49 therebetween and to be closely but non-contactingly conformal to carrier surface 12, a second gap 51 of substantially uniform width being formed between free ends 48,50 and surface 12.

Extending from polepiece ends 48,50 is a typical fringing magnetic field which is arcuate in compliance with the configuration of the free ends. When magnetorheological fluid 14 being carried on carrier surface 12 reaches the polepiece ends, the magnetic field in the gaps causes the leading magnetorheological fluid to respond in known fashion by stiffening into a paste- or clay-like consistency, thereby filling first gap 49 and plugging second gap 51 to form a plug defining a dynamic liquid seal 53 between the magnet and the carrier surface. Surface 12 is wiped clean of fluid and is prepared to continue onward to be recoated with replenished fluid by nozzle 20 as shown in FIG. 1. As carrier wheel 13 continues to turn and thereby to convey additional magnetorheological fluid against seal 53, the additional fluid is diverted away from the carrier surface and flows, either by gravity or by suction, along the upper surface 55 of polepiece 36 through chamber 42 and thence through tube 26. Thus, surface 12 is continuously wiped clean of magnetorheological fluid by wiper 34 without any mechanical contact with surface 12.

As noted above, since the magnetic field is formed in gap 49 between the polepieces 48,50, the axis of the field is tangential to wheel surface 12, thus producing the most easily sheared MRF structure.

Referring to FIGS. 4 through 7, an improved magnetic wiper assembly 134 in accordance with the invention may substitute directly for prior art wiper assembly 34 as shown in FIG. 3. An arcuate collection ring 136 comprises an arcuate ferro-magnetic bar 138, formed preferably of iron, having a plurality of bar or pin magnets 140 disposed in wells 142 formed in bar 138. Preferably, the spacing between adjacent of the pin magnets is equal to about the radius of a pin magnet. The magnetic orientation (north/south) of magnets 140 alternates from one magnet to the next, such that bar 138 acts as a common shunt bar coupling all adjacent magnets 140. The alternating polarities of the outer ends 144 of magnets 140 create an intense fringing field above ends 144 which preferably has a strength of about 3000 gauss. The magnets are supported by, and extend through, a non-magnetic cage 146 overlying shunt bar 138.

Wiper assembly 134 includes a housing 148 formed of a non-magnetic material, for example, a rigid organic polymer, surrounded by a magnetic shell 150 to shield MRF within the wiper assembly. Housing 148 supports collection ring 136 and positions magnet ends 144 at a uniform off-spaced distance (gap 152) from the surface 12 of carrier wheel 13 of preferably between about 10 micrometers and about 50 micrometers. A non-magnetic insert 154 cooperates with housing 148 to form an inlet throat 156 and chamber 158 for conveying collected magnetorheological fluid 14 away from wheel 13. An outlet pipe 160 is connected to a source of vacuum 162 or a pump for removing MRF 12 from chamber 158 and returning the MRF to delivery system 18 (FIG. 1).

Figure 4:
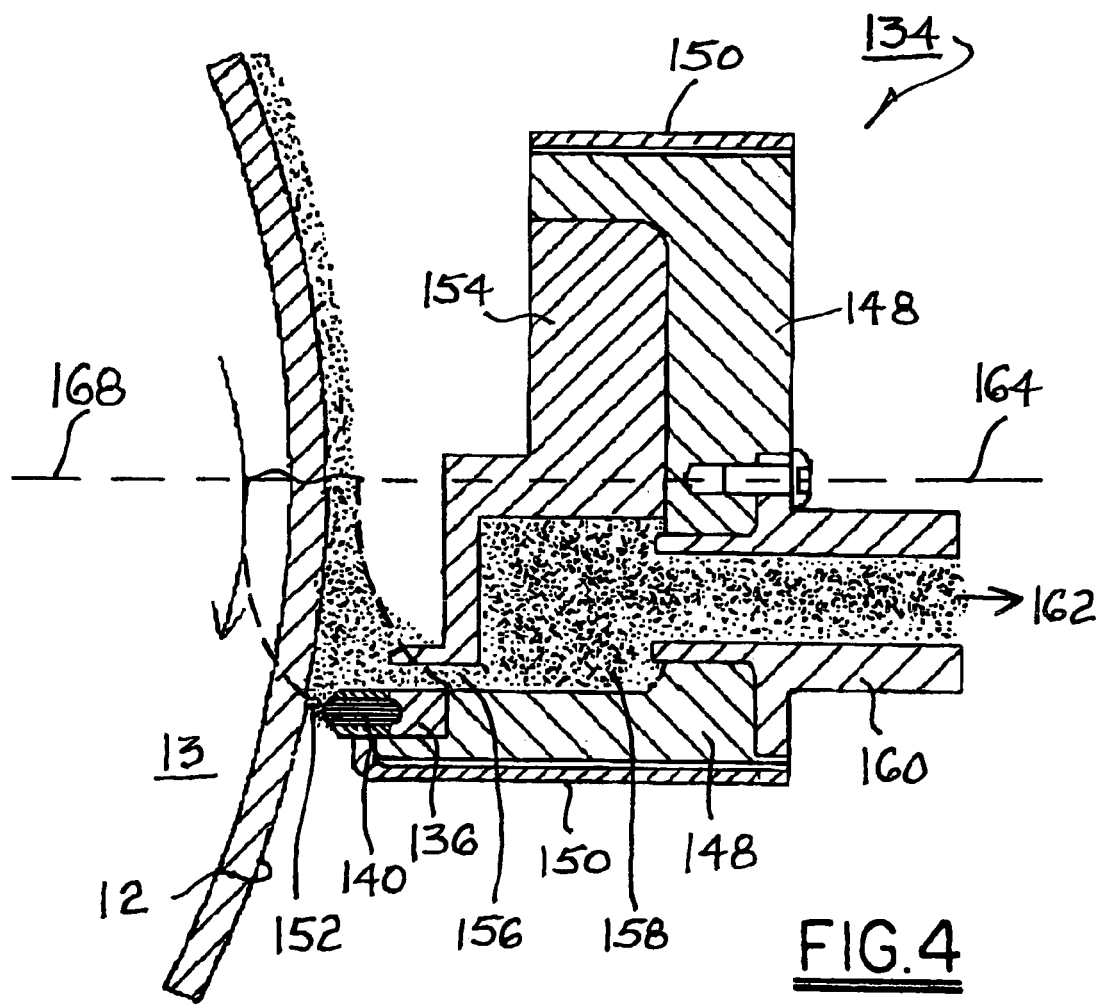
FIG. 4 is an elevational cross-sectional view of a magnetic wiper in accordance with the invention, showing the wiper in operation on a magnetorheological finishing machine like that shown in FIG. 1.
Figure 5:
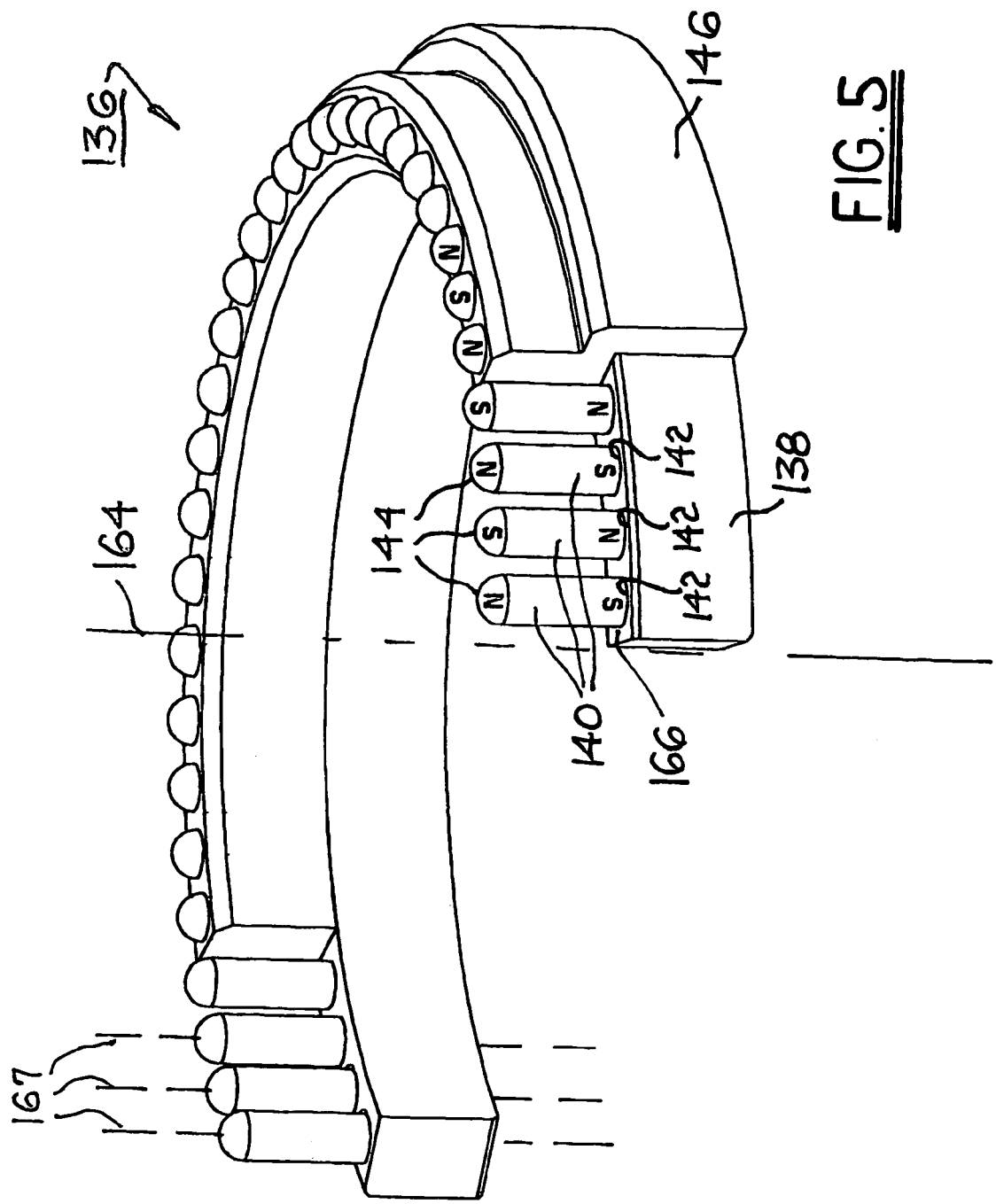
FIG. 5 is an isometric view, partially in cutaway, of a shunt bar and magnets for use in the novel wiper shown in FIG. 4.
Figure 6:
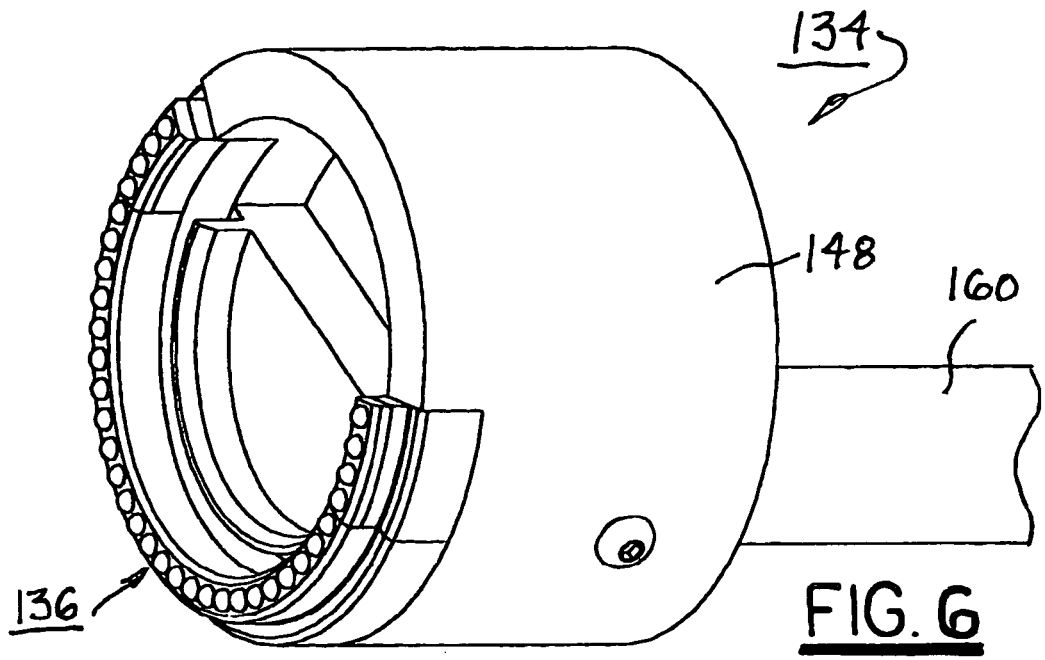
FIG. 6 is an isometric view of the magnetic wiper shown in FIGS. 4 and 5.
Figure 7:
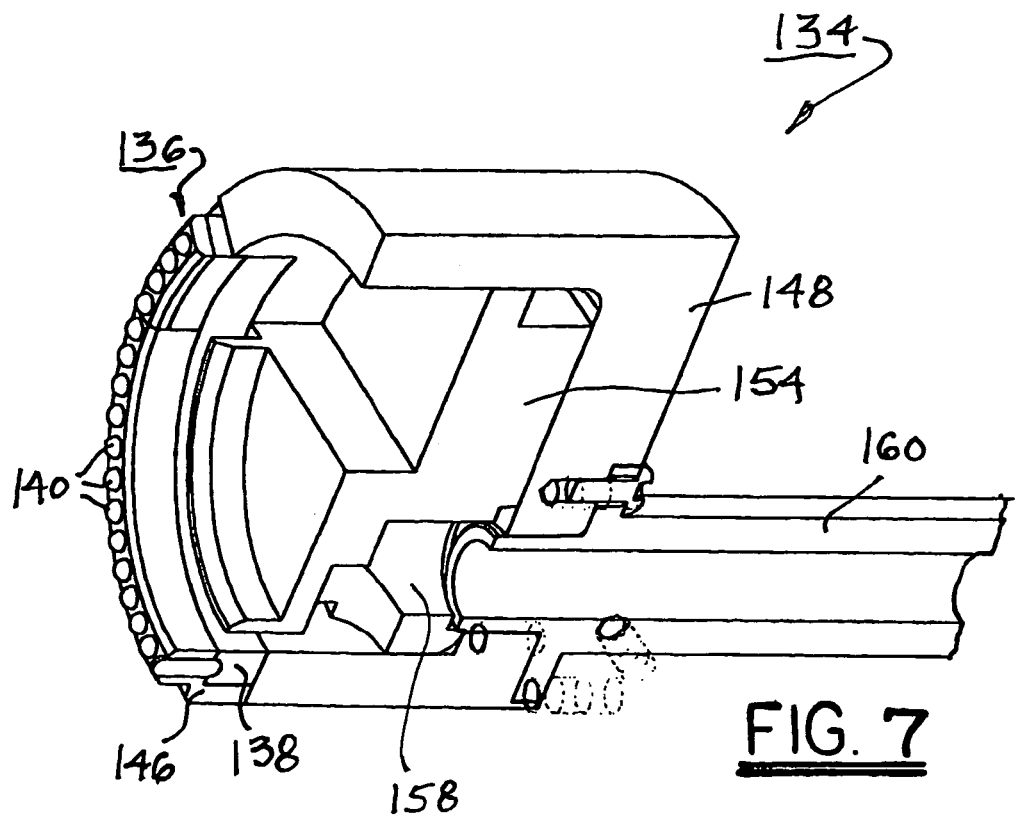
FIG. 7 is a cutaway view of the wiper shown in FIG. 6.

Typically, carrier wheel 13 is a spheric section as described above. Therefore, in a currently-preferred embodiment of the invention, bar 138 is formed as a cylindrical section, having a cylindrical axis 164, wherein magnets 140 are disposed in an axial face 166 thereof and wherein the locus of magnet ends 144 is a circle. As shown in FIG. 4, when wiper assembly 134 is positioned for use with cylinder axis 164 located on an extension of any carrier wheel radius 168, axis 164 transects surface 12. All magnet axes 167 are parallel with cylinder axis 164 and radius 168, and all magnet ends 144 are uniformly off-spaced from the surface 12 of wheel 13 irrespective of the length of radius 168. Thus a given wiper assembly 134 may be used without modification over a wide range of MRF finishing machines having differing-radius carrier wheels. In embodiment 134, surface 12 seals by proximity to the axial ends 144 of magnets 140.

The advantages of improved wiper 134 over prior art wiper 34 are at least as follows:

First, a stronger magnetic field is imposed on the gap between the wiper and the wheel. This field can be between about 2000 gauss and about 4000 gauss, depending upon the size and composition of the pin magnets, and preferably is about 3000 gauss.

Second, the cylindrical shape of the shunt bar and magnet array permit a single wiper to be used on any spherical carrier wheel having a radius greater than the radius of the shunt bar.

Third, because the axes of the magnets are nearly orthogonal to the wheel surface, being parallel to a radius of the wheel, the shear resistance of the MRF structure formed by a magnetic wiper is greatly increased.

Fourth, because of the axes' orientation and the small diameter of the pin magnets, preferably about 2 mm or less, the wheel-circumferential extent of the dynamic seal is greatly reduced over that of the prior art wiper, thus reducing wear of the wheel surface in use, and reducing the drive motor torque requirements and consequent size.

Referring to FIGS. 8 through 10, a shaft seal assembly 234 in accordance with the invention is shown. An arcuate seal ring 236 comprises an arcuate ferromagnetic bar 238, formed preferably of iron, having a plurality of bar or pin magnets 240 disposed in wells 242 formed in bar 238. The magnetic orientation (north/south) of magnets 240 alternates from one magnet to the next, such that bar 238 acts as a common shunt bar coupling all adjacent magnets 240 on the outer ends of the magnets. The alternating polarities of the inner ends 244 of magnets 240 create an intense fringing field above ends 244 which preferably has a strength of about 3000 gauss and which alternates in polarity circumferentially of ring 236. The magnets are supported by, and extend through, a non-magnetic supportive cage 246 overlying shunt bar 238.

A cylindrical shaft 300 having an outer surface 302 to be sealed is disposed axially through ring 235 such that magnet ends 244 are disposed at a uniform off-spaced distance (gap 252) from the surface 302 of preferably between about 10 micrometers and about 50 micrometers. Bar 238 is formed as a cylindrical element, having a cylindrical axis 264, wherein magnets 240 are disposed radially thereof and wherein the locus of magnet ends 244 is a circle.

Although magnets 240 are preferably disposed radially of bar 238, shaft 300, and axis 264, it will be seen that magnets 240 in fact may be disposed at any desired angle of magnet axes 267 to shaft surface 302 because the magnetic field 304 (FIG. 10) formed by each magnet extends hemispherically from the magnet ends 244 which are also preferably hemispherical. Thus, magnets 240 may be oriented having axes 267 parallel to shaft and ring axis 267 as desired.

An amount of magnetorheological fluid 14 is disposed in gap 252 and is stiffened and held there by field 304. In an important advance over prior art magnetic seals having a single magnetic polarity at the gap, thereby creating a magnetic field having field lines generally parallel to the sealing surface, it will be seen that the lines of magnetic force in field 304 closing between the north and south poles of the magnetic array are highly non-parallel to surface 302, including in the circumferential direction. Thus, stiffening fibrils that are known to be formed in the MRF extend across the gap rather than parallel to surface 302, as in the prior art, in a direction wherein the fibrils are substantially more resistant to shear. Thus, a dynamic seal formed by MRF in the gap in accordance with the invention is much stronger that a comparable prior art seal. Further, the seal is confined to a very short axial extent of the shaft surface in the immediate vicinity of the magnet ends, thus reducing dramatically the frictional drag imposed by a magnetic seal.

Of course, it will be seen that a seal also may be formed using a magnetic fluid instead of a magnetorheological fluid, a magnetic fluid being defined as a fluid containing permanent colloidal magnetic solids but not having magnetorheological properties.

A seal in accordance with the invention is useful against passage of gas along a shaft surface during shaft reciprocity and/or shaft rotation.

From the foregoing description, it will be apparent that there has been provided an improved non-contact wiper for removing magnetorheological fluid from a carrier surface, wherein the fringing field of a plurality of pin magnets disposed adjacent to the carrier surface stiffens some of the magnetorheological fluid to form a dynamic seal against which additional fluid piles up and may be diverted away from the carrier surface. Variations and modifications of the herein described non-contact wiper, in accordance with the invention, will undoubtedly suggest themselves to those skilled in this art. Accordingly, the foregoing description should be taken as illustrative and not in a limiting sense.

What is claimed is:

1. A magnetic seal assembly for providing a seal between the assembly and a surface of an object spaced apart from the assembly by a gap, the assembly comprising:
    a) a ferromagnetic shunt bar;
    b) a plurality of magnets, each having opposed north and south pole ends, said magnets being arranged in an array along said shunt bar and attached thereto at first pole ends in alternating magnetic polarities such that second pole ends extend from said shunt bar in alternating polarities; and
    c) a magnetically-responsive fluid disposed in said gap between said second pole ends and said surface.

2. A magnetic seal assembly in accordance with claim 1 wherein said magnetic shunt bar is arcuate and said surface is arcuate.

3. A magnetic seal assembly in accordance with claim 2 wherein said shunt bar is cylindrical, having a cylinder axis, wherein each magnet of said array has a magnet axis, and wherein the orientations of said magnet axes to said cylinder axis are selected from the group consisting of parallel to said cylinder axis, radial of said cylinder axis, and any angle between parallel to and radial of said cylinder axis.

4. A magnetic seal assembly in accordance with claim 3 wherein said surface is adjacent an end of said cylindrical shunt bar supportive of said magnet array and transects said cylinder axis.

5. A magnetic seal assembly in accordance with claim 4 wherein said assembly is a component of a wiper for removing magnetorheological fluid from a carrier surface of a magnetorheological finishing machine.

6. A magnetic seal assembly in accordance with claim 3 wherein said surface is disposed through said cylindrical shunt bar in a direction parallel with said cylinder axis.

7. A magnetic seal assembly in accordance with claim 6 wherein said object is a shaft and said seal assembly is a shaft seal.

8. A magnetic seal assembly in accordance with claim 7 wherein motion of said shaft with respect to said cylinder axis is selected from the group consisting of rotational about said axis, translational in the direction of said axis, and motionless.

9. A magnetic seal assembly in accordance with claim 1 wherein said magnetically-responsive fluid is selected from the group consisting of a fluid having permanent magnetic particles therein and a fluid having magnetizable particles therein.

10. A magnetic seal assembly in accordance with claim 1 wherein a magnetic field formed around said second pole ends comprises magnetic field lines that extend from each of said second pole ends and that close at adjacent second pole ends.

11. A magnetic seal assembly in accordance with claim 10 wherein a portion of said field lines pass through said surface at an angle thereto.

12. A magnetic wiper assembly for removing magnetorheological fluid from a surface of a carrier wheel being moved past said wiper assembly and being spaced apart from said wiper assembly by a gap, said wiper assembly comprising a multi-pole magnet system having a plurality of individual magnets including a plurality of north pole elements and a plurality of south pole elements for generating a multi-polar magnetic field in said gap.

13. A magnetic wiper assembly in accordance with claim 12 wherein said magnet system comprises:
    a) a ferromagnetic shunt bar; and
    b) a plurality of magnets attached at first ends thereof to said shunt bar and extending at second ends thereof from said shunt bar toward said surface.

14. A magnetic wiper assembly in accordance with claim 13 wherein said shunt bar is arcuate.

15. A magnetic wiper assembly in accordance with claim 14 wherein said shunt bar is cylindrical and said magnets extend from an axial face thereof.

16. A magnetic wiper assembly in accordance with claim 15 wherein each of said magnets has a magnet axis and said cylinder has a cylinder axis, and wherein said magnet axes are parallel with said cylinder axis.

17. A magnetic wiper assembly in accordance with claim 16 mounted for use with said carrier wheel wherein said cylinder axis is coincident with an extension of a radius of said carrier wheel.

18. A magnetic wiper assembly in accordance with claim 13 further comprising:
    a) means for positioning said second magnet ends at a predetermined distance from said carrier wheel surface;
    b) means for magnetically shielding wiped magnetorheological fluid within said assembly; and
    c) means for conveying said wiped magnetorheological fluid from said assembly.

19. A magnetic wiper assembly in accordance with claim 13 wherein said magnets have alternating magnetic polarities at said second ends.

20. A magnetic wiper assembly in accordance with claim 13 wherein the spacing adjacently between said magnets is equal to about the radius of a magnet.

21. A magnetic wiper in accordance with claim 13 wherein a magnetic field produced by said plurality of magnets has a field strength between about 2000 gauss and about 4000 gauss.

22. A magnetic wiper in accordance with claim 21 wherein said field strength is about 3000 gauss.

23. A magnetic wiper for removing magnetorheological fluid from a carrier surface, the fluid being carried along a path on the carrier surface, comprising:
   a) a plurality of magnets spaced apart from said carrier surface to define a gap therefrom, said magnets being spaced apart from each other and extending from a common magnetic shunt bar, said magnets having axes disposed non-tangentially of said carrier surface to form a magnetic field having an axis transverse of said path in said gap for stiffening and retaining a first amount of said magnetorheological fluid in said gap, said stiffened fluid forming a dynamic liquid seal for preventing the passage of further amounts of said magnetorheological fluid through said gap and for diverting said further amounts away from said carrier surface; and
   b) means for receiving and conveying said diverted magnetorheological fluid away from said carrier surface.

24. A magnetorheological finishing machine comprising a carrier surface and a magnetic wiper for removing magnetorheological fluid from said carrier surface, wherein said magnetic wiper is provided in accordance with claim 23.

\* \* \* \* \*